Sept. 23, 1969  K. RUSHING ET AL  3,468,391
SENSING DEVICE FOR USE WITH A VEHICLE ADAPTED TO TRACE
A PATH DEFINED BY A CONDUCTOR
Filed April 5, 1967  3 Sheets-Sheet 1

INVENTORS
KARL RUSHING
JOHN CLARENCE ALLEN JR.

BY Darby & Darby
ATTORNEYS

Sept. 23, 1969  K. RUSHING ET AL  3,468,391
SENSING DEVICE FOR USE WITH A VEHICLE ADAPTED TO TRACE
A PATH DEFINED BY A CONDUCTOR
Filed April 5, 1967  3 Sheets-Sheet 2

INVENTORS
KARL RUSHING
JOHN CLARENCE ALLEN JR.
BY Darby & Darby
ATTORNEYS

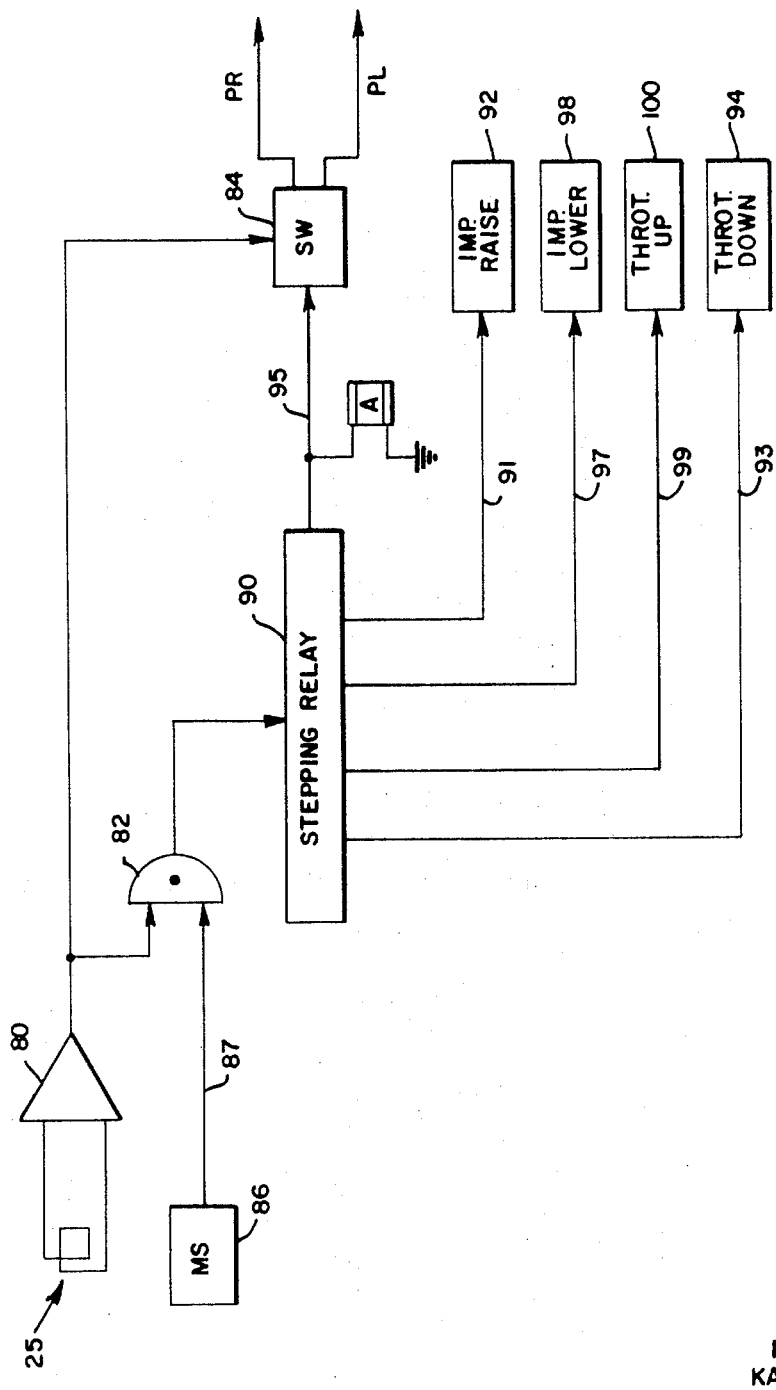

3,468,391
SENSING DEVICE FOR USE WITH A VEHICLE ADAPTED TO TRACE A PATH DEFINED BY A CONDUCTOR

Karl Rushing, 101 N. Sunflower Ave., and John Clarence Allen, Jr., P.O. Box 87, both of Indianola, Miss. 38751
Continuation-in-part of application Ser. No. 531,603, Mar. 3, 1966. This application Apr. 5, 1967, Ser. No. 628,616
Int. Cl. B60k 33/00
U.S. Cl. 180—98                                       4 Claims

ABSTRACT OF THE DISCLOSURE

Apparatus for causing a vehicle to trace a path defined by a wire having an audio frequency signal impressed thereon comprises two coils connected in series opposing relationship, said coils being disposed at an angle with respect to each other such that the orientation of the coils with respect to the wire and the proximity of the respective coils to the wire determine which of the coils is to produce the overriding control signal. A reference voltage derived from a third coil is then compared with the combined output of the two first mentioned coils to produce a digital control signal dependent upon the phase relationship of the reference and combined output voltages.

---

The present invention is a continuation-in-part of application No. 531,603 filed on Mar. 3, 1966, in the names of John Clarence Allen, Jr., Roy Rodgers Brashier, and Karl Rushing, and entitled Automatic Farming Apparatus.

BACKGROUND OF THE INVENTION

The above mentioned application No. 531,603 relates to an automatic farming system wherein a tractor is caused to follow a path defined by a conductor buried in the field to be farmed. The system disclosed in application No. 531,603 is an improvement over the automatic farming apparatus disclosed in U.S. Patents Nos. 2,842,039 and 3,169,598. The present invention is designed specifically for use in such a system and, in certain respects, is an improvement over the overall system. In its most specific aspects, the present invention provides an improved signal receiving means for causing a tractor or other vehicle to trace a path as defined by a buried conductor.

BRIEF SUMMARY OF THE INVENTION

Briefly, according to the invention a signal receiving means for controlling the movement of a vehicle with respect to a tracing conductor comprises two angularly disposed coils electrically connected in a series opposing relation. The coils are physically positioned such that the combined voltage will equal zero only when they are in a specific position with respect to the conductor. In all other positions, a voltage output having a positive or negative phase will appear depending upon the proximity of the coils to the conductor and its orientation with respect thereto. The signal receiving means may further include a third coil adapted to ride in a transverse position with respect to the conductor when the output of the first two mentioned coils is properly balanced. The output of the third coil serves as a reference voltage for the steering control circuits.

In the preferred embodiment of the invention, the physical supporting means for the coils is mechanically linked to the front or steering wheels of the vehicle so that the coils are always oriented in the same direction as the steering wheels. The steering control circuits are phase responsive and operate in a digital manner in the sense that steering correction occurs whenever the two received signals are not balanced and dependent only upon which of the two is stronger.

BRIEF DESCRIPTION OF THE DRAWINGS

FIG. 5 is a block diagram of a circuit which may be used with the invention for automatic farming purposes.

DETAILED DESCRIPTION

Figure 1:
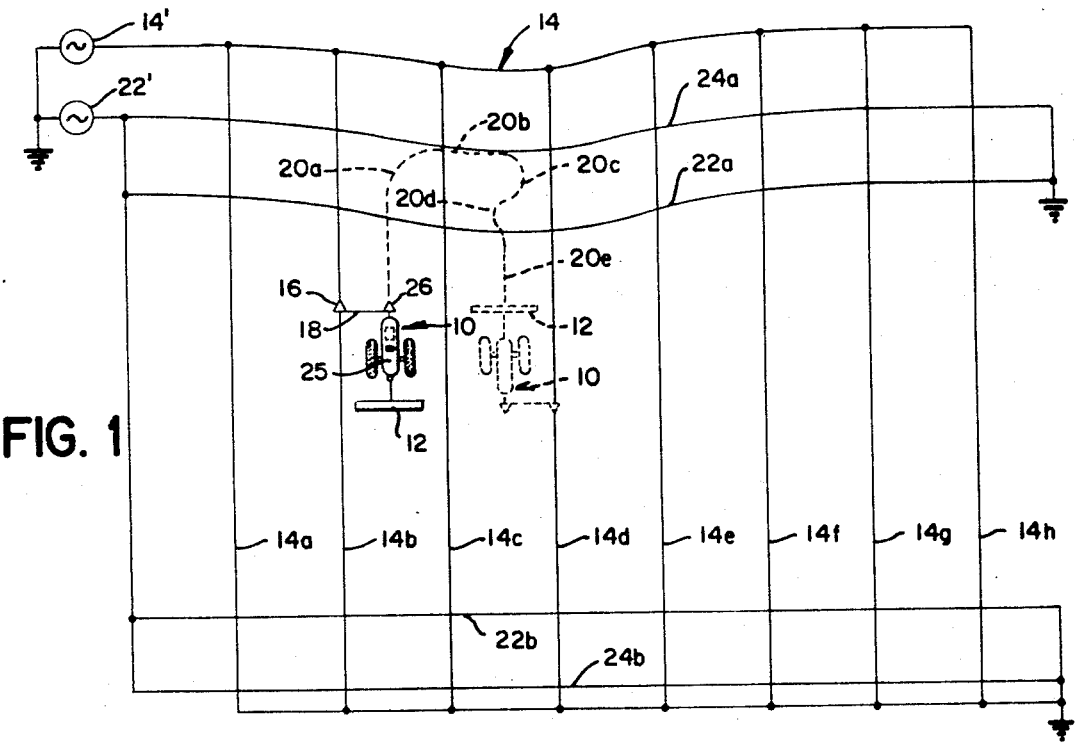
FIG. 1 is a schematic illustration of a preferred embodiment of the invention.

FIGURE 1 illustrates schematically the wires as they would actually be placed on a representative tract of land. The tractor or other vehicle is shown generally at 10 pulling a farm implement 12 such as a plow. Obviously, the various parts are not drawn to scale. A tracing circuit 14 is buried throughout the length of the field so as to form parallel rows of buried conductors shown as 14a, 14b, 14c, etc., all of which are electrically connected in shunt. The wires 14 are buried a sufficient distance beneath the surface so as not to be disturbed by implement 12, for example, about two feet.

Tractor 10 carries a signal receiving means 16 mounted on a boom 18 extending from the front of tractor 10. As explained in detail below, receiver 16 picks up signals from one of the wires 14 (14b in the illustrated case) which are used to maintain the tractor in a fixed position with respect to the tracing wire. Thus, tractor 10 will travel along the path indicated by dotted line 20 while pulling implement 12 through the field.

Two wires 22a and 22b are buried at opposite edges of the field so that each crosses the wires 14a, 14b, etc. A pair of third lines 24a and 24b, substantially parallel to lines 22a and 22b, respectively, are buried in the field slightly beyond the respective lines 22a and 22b.

A conventional signal generator 14' applies an alternating voltage of a first frequency to the parallel wires 14a, 14b, etc., and a similar signal generator 22' similarly energizes the lines 22a, 22b, 24a and 24b, which are shunt connected with respect to generator 22'. The tractor also includes a second and third signal receiving means 25 and 26, respectively, for receiving the alternating signal impressed on lines 22 and 24, respectively. In the preferred embodiment, receivers 25 and 26 are identical to receiver 16. The signals on lines 14, 22 and 24 are used for the control of tractor 10 and implement 12, as explained below. The following description with respect to FIGURE 1 is given in purely functional terms for explanatory purposes.

As tractor 10 proceeds along path 20 with receiver 16 over tracing line 14b, various steering servos maintain the tractor 10 in its properly aligned position so that implement 12 cuts a straight path across the field. When receiver 25 picks up the tone on line 22a (which differs from the tone on line 14) it causes a programmed turn sequence to be initiated depending upon the edge of the field which the tractor is approaching. In other words, if tractor 10 is travelling from bottom to top in FIG. 1, the signal on line 22a, when received, would override the signal on line 14 and cause the tractor to commence a ninety degree right turn as shown by the dotted line portion 20a. Prior to the turning operation the signal on line 22a causes a mechanism (not illustrated) to reduce the vehicle speed and lift the implement 12 out of the ground which, for known reasons, is desirable when the tractor is turning.

After the turn is commenced, receiver 26 causes the tractor to seek line 24a and follow that line as shown at 20b. After a predetermined delay or distance, which, as explained below, may readily be incorporated into the preferred embodiment of the invention, the control apparatus on the tractor causes the tractor to commence a ninety degree turn back toward the field along the path 20c. The tractor then commences to seek line 14e. In other words, the signal from receiver 16 responsive to line 14 causes the tractor 10 to move on a path 20d toward the tracing line closest to it, which, in this example, is line 14d.

The tractor follows line 14d along path 20e until the signal on line 22b is received. At this point substantially the same operation as described above recurs with the initial programmed turn being to the left. Tractor 10 continues along the path defined by line 24b for a predetermined interval of time and then turns to the left to seek and follow line 14e.

In application No. 531,603 separate tones were applied to lines 22 and 24, but this has been found unnecessary, particularly with the signal receiving arrangement of the present invention as will become apparent below.

This procedure continues until the entire area has been covered. Depending upon the number of tractors, the width of the implement, etc., more than one pass over the area may be required, but this will present no special problems, and representative examples are given in application No. 531,603 with reference to FIGURE 4 thereof.

Figure 2:
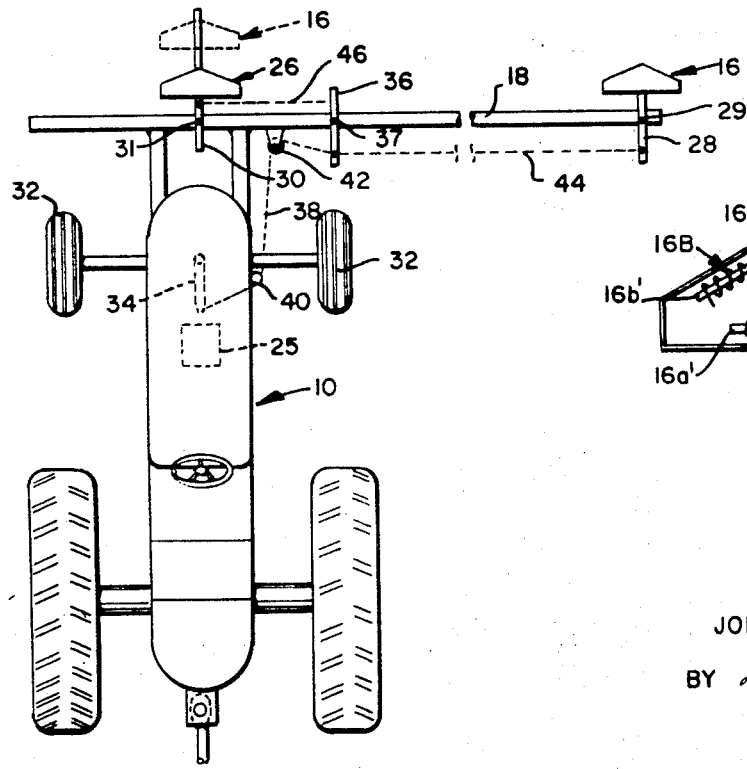
FIG. 2 is a top view of a tractor modified in accordance with the invention.

FIGURE 2 is a detailed view of the essential elements of the tractor construction insofar as they relate to the present invention. Signal receiving means 16 is mounted on a bar 28 pivotally pinned to the arm 18 at 29. Similarly, the receiver 26 is mounted directly on a rod 30 which is pivotally pinned to arm 18 at 31. The position of the individual receivers with respect to rod 28 and 30, and the distance between the two may be made adjustable by obvious means (not illustrated). It is not always necessary to mount receiver 16 on a boom, and in certain applications it may be desirable to position receiver 16 on rod 30, or its equivalent, as shown in dotted lines.

The front wheels 32 of the tractor are mechanically linked in any suitable fashion to a central lever 34 pivotally mounted, for example, on the tractor frame (not shown), so that lever 34 pivots when the wheels 32 are turned in either direction. A third bar 36 is pinned to the arm 18 at 37 and linked to lever 34 by push-pull control cable 38 passing over guide rollers 40 and 42 which are mounted on the tractor 10 and arm 18, respectively. The cable link 44 connects the free end of the rod 28 to rod 36 and a similar push-pull control cable 46 mechanically couples the rod 36 to the bar 30 on which receiving means 26 is mounted. The purpose of this construction is to ensure that the receivers are always oriented in the same direction as the front wheels. Obviously, any suitable means for achieving this objective may be substituted for the construction illustrated in FIGURE 2.

Figure 3A:
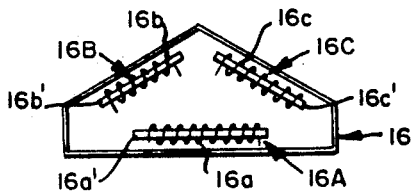
FIG. 3A is a detailed view of the signal receiving means according to the invention.

The mechanical constructions of receivers 16 and 26 are identical and therefore only receiver 16 is explained in detail. As shown in FIGURE 3A, receiving means 16 consists of three sections, 16A, 16B and 16C. Each section comprises a coil 16a, b or c wound about a respective ferrite core, 16a', b', or c', the electrical connections of which are illustrated and described with reference to FIGURE 3B. Physically, the axes of the coils 16a, 16b and 16c are aligned as illustrated in FIGURE 3A, that is, with coil 16a perpendicular to the direction in which front wheels 32 are facing, and with coils 16b and 16c each at an angle of 60° with respect to such direction. As will become more apparent below, this angle is not critical but has been selected as a value which provides optimum results in a particular practical embodiment. Each coil comprises a separate signal detector, which, as known, has maximum effectiveness (i.e. receiving ability) for signals arriving from the direction along which its axis is aligned. In other words, when a coil such as 16a is perpendicular to the conductor 14, its voltage output is a maximum for a given distance between the coil and conductor.

Figure 3B:
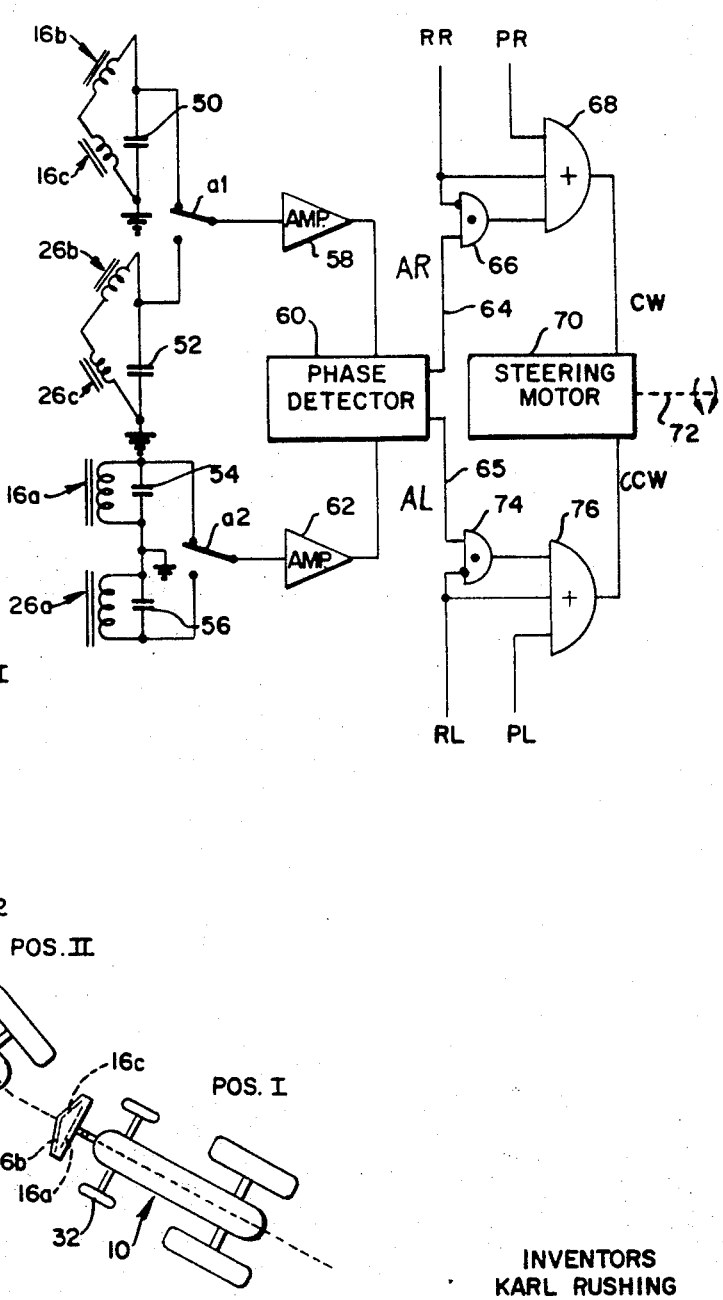
FIG. 3B is a block diagram of a steering control circuit for use with the tractor of FIG. 2.

FIGURE 3B is a semi-schematic electrical diagram showing the manner in which the coils of the antennas 16 and 26 are interconnected with respect to the steering circuits for the tractor. The coils 16b and 16c are of equal inductance and connected so that opposing voltages are induced in the respective coils. The capacitor 50 is shunted across the series connection of coils 16b and 16c to form a circuit which is resonant at the frequency of generator 14', for example, 14,000 Hz. Coils 26b and 26c are also equal and connected in a series-opposing relation with a capacitor 52 connected across the combination to resonate the circuit at the frequency of generator 22', for example, 2800 Hz. With this arrangement, receiver 16 only responds to the signals on line 14 and receiver 26 to the signals on lines 22 and 24. A capacitor 54 is connected directly across the third coil 16a and capacitor 56 across coil 26a to resonate these coils at the frequencies of generators 14' and 22', respectively.

The initiation of the various circuit operations are controlled by a relay a illustrated and described with reference to FIGURE 5. In FIGURE 3B, two contacts a1 and a2 of relay a are shown in their position when receiver 16 is guiding the tractor.

With relay contacts a1 and a2 in the condition illustrated, the difference between the voltage induced in coils 16b and 16c is amplified by an amplifier 58 and coupled to a phase detector 60 which compares this difference voltage with the reference voltage induced in coil 16a and amplified by amplifier 62. Phase detector 60 is a conventional device which, for example, produces a binary "1" or enable signal on an output line 64 and a binary "0" or inhibit signal on another output line 65 when the outputs of amplifier 58 and 62 are in phase. When the output of amplifier 58 is 180° out of phase with the output of amplifier 62, the output condition of detector 60 reverses, i.e., a binary "1" appears on line 65 and a binary "0" on line 64. This indicates which of the coils 16b or 16c is receiving the stronger signal, since, assuming coils 16a and 16b are wound to produce in-phase voltages, if the voltage induced in coil 16b is greater than the voltage induced in coil 16c, the inputs to detector 60 will be in phase. On the other hand, if the voltage induced in coil 16c is greater than that induced in coil 16b, the voltage output of amplifier 58 will be 180° out of phase with the reference voltage across coil 16a.

If an enable output appears on line 64, it is passed through an AND gate 66 and an OR gate 68 to the steering motor 70, causing the output shaft 72 of the motor to rotate, for example, in a clockwise direction. If an enable output appears on line 65, it is coupled through an AND gate 74 and an OR gate 76 to the motor 70 to cause output shaft 72 to rotate counterclockwise. Of course, when gate 66 is opened, gate 74 is inhibited by the output of detector 60 and vice versa. If the voltages induced in the coils 16b and 16c are identical, there is no output from amplifier 58, in which case phase detector 60 applies a binary "0" or inhibit signal to both lines 64 and 65, which will have no effect upon motor 70. This is the condition which exists when the tractor is tracing properly with respect to the tracing wire 14. By way of example, phase detector 60 may be a conventional ring modulator, in which case it may be desirable for AND gates 66 and 74 to include DC amplifiers to provide sufficient power to switch the controls for the tractor 70. As explained below, gates 66 and 74 are normally enabled by the absence of signals on the inhibit inputs labelled RR and RL, respectively.

Figure 4:
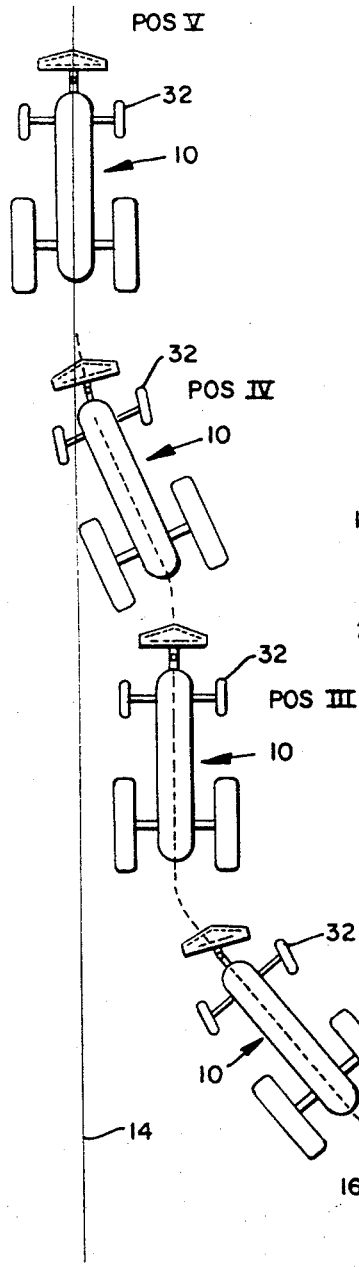
FIG. 4 is a schematic diagram showing how the invention causes a vehicle to trace a path defined by a conductor.

FIGURE 4 is an explanatory diagram showing how the automatic control circuit of FIGURE 3B achieves the desired function. Tractor 10 is shown in five positions, labeled position I to position V, on a typical path approaching a tracing wire 14. In position I, coil 16c is substantially perpendicular to the wire 14, while the coil 16b is almost parallel thereto. Accordingly, the signal induced in coil 16c is substantially stronger than that induced in coil 16b, and steering motor 70 is caused to turn the wheels 32 of the tractor to the right. Since wheels 32 are mechanically linked to the antenna 16 (see FIG. 2) the tractor will assume the condition shown in position II of FIGURE 4. In this condition, coils 16b and 16c are at virtually the same angle with respect to line 14, but coil 16b is substantially closer to the line than is coil 16c. Accordingly, in position II, the voltage induced in coil 16c is greater than the voltage induced in coil 16b and phase detector 60 switches the binary "1" or enable signal from line 64 to line 65, causing the steering motor 70 to operate so as to turn the wheels toward the left. This new condition is illustrated in position III and, since coil 16b is still closer to the line 14, it still receives the stronger signal and continues to operate the motor 70 to turn the wheels 32 to the left.

As the wheels start to the left from position III, coil 16c becomes substantially perpendicular to the line 14 and therefore receives the stronger signal, thus causing the tractor to start turning to the right as shown in position IV. This hunting continues until the tractor reaches he position shown in position V where the outputs of coils 16b and 16c are completely balanced so that the tractor will trace along the desired path. If there is any deviation of the tractor 10 with respect to the tracing line 14, the operation to realign the two is substantially as described.

This particular arrangement whereby the signal receiving means is responsive not only to proximity to the tracing line, but also the orientation of the receiver with respect to the line, enables very accurate tracing with relatively inexpensive electronic circuits and without the need for accurately measuring the difference between various analog signals, as is customarily the case in automatic tracing circuits of this nature. In the preferred embodiment, audio frequencies are employed and the receiving means couple directly into the near field of the conductor. Conceivably, the principles of the invention may also be applied with directional radio frequency antennas in place of the coils.

The said application No. 531,602 disclosed specific means for automatically programming the tractor and farming implements as well as the remote control radio system. It is contemplated that the features of the present invention may be used in the identical system, however, such features are not restricted to a particular environment or even to farming purposes.

The programming device in said application No. 531,-603 is primarily an electronic system. It has been found, that for farming purposes, a very simple electromechanical system using stepping relays and relay logic circuits can accomplish all that is required of the program unit while substantially reducing expense and increasing reliability. A block diagram of such an electromechanical program unit is illustrated in FIGURE 5.

Referring to FIGURE 5, when the tractor 10 passes over the wire 22a or 22b (see FIG. 1), a signal is detected by signal receiving means 25 located beneath the tractor (the same signal is also picked up by receiver 26, but this latter receiver is disconnected by virtue of the relay contacts a1 and a2; see FIG. 3B). The output of receiver 25 is amplified by an amplifier 80; the output of which in turn enables an AND gate 82 and sets a switch 84 as explained below. Receiver 25 does not control the actual tracing operation and may therefore comprise a single coil tuned to the frequency applied to wires 22a, b. In an operable embodiment of the invention, however, receiver 25 was of the same construction as receivers 16 and 26 to provide a more precise and reliable wire crossing indication.

Tractor 10 may have a small microswitch 86 physically positioned adjacent an axle of the tractor and adapted to be actuated by appropriate cams secured to the axle during rotation thereof. By way of example, the microswitch 86 may be actuated twice during each full revolution of the front wheels so that two equally spaced pulses will appear on line 87 each full revolution of the front wheels. As a typical example, such pulses may occur every four feet traversed by the tractor.

The pulses on line 87 pass through the AND gate 82 after it has been enabled by a signal from antenna 25 to energize a stepping relay 90. Stepping relay 90 is a conventional relay which may energize one or more of a plurality of output lines depending upon the number of input pulses received through the AND gate 82. The stepping relay may include a plurality of rotary switches connected in parallel so that the relay output is in effect a binary count corresponding to the number of input pulses received. Conceivably, the stepping relay 90 may energize one or more of a plurality of outputs by means of a single rotary switch so as to similarly initiate the required operation.

The first operation to occur after crossing line 22a is to raise the farming implement from the ground; therefore, the first output of stepping relay 90 is a signal on line 91 which causes an implement raising means 92 to lift the implement. Immediately thereafter, a signal is applied to the line 93 by relay 90 to cause a device 94 to throttle down the tractor so that the tractor speed is substantially reduced for the programmed turn operation.

The programmed turn is initiated by a signal PR or PL from the switch 84 depending upon its state. For example, referring to FIGURE 1- if tractor 10 is traveling from bottom to top it is desired to turn the tractor to the right after crossing line 22a, switch 84 is set so that upon receipt of a signal from amplifier 80, a signal is applied to the line PR. This signal is then coupled through the OR gate 68 (FIG. 3B) to the steering motor 70 such that the output shaft 72 rotates to turn tractor 10 to the right. At the same time, the signal on line 95 energizes the relay a which operates the contacts a1 and a2 (FIG. 3B) such that the receiver 26 is coupled into the steering motor control circuit. The signal PR will only last for a short period of time, after which the tractor is controlled by the signals detected by coils 26b and 26c in the same fashion as previously described with respect to coils 16b and 16c. Of course, when under the control of receiver 26, tracing occurs along the line 24a or 24b rather than one of the lines 14.

After the tractor has travelled a predetermined distance, a second signal is applied to the line 95 and passed through switch 84 to the output line PR causing a second right turn to be initiated. This second right turn corresponds to the tractor path 20c illustrated in FIGURE 1 and will direct the tractor back toward one of the wires 14. After this second right turn is commenced, the stepping relay 90 applies a signal to line 97 which energizes an implement control means 98 to lower the farming implement into the earth. A second signal on a line 99 from the stepping relay 90 causes a further control device 100 to increase the speed of the tractor to its normal rate. The appearance of the second pulse on line 95 also de-energizes relay A so that the contacts a1 and a2 illustrated in FIG. 3B are returned to the illustrated condition, i.e. with the tractor under the control of signal from receiver 16. The tractor will then continue to trace along one of the lines 14 until such time as the wire 22b is crossed at the far end of the field.

To cause the required alternate right and left turning sequence at opposite ends of the field, switch 84 may be a bi-stable device which changes condition upon receipt of successive pulses from amplifier 80 whereby the lines PR and PL are alternately energized. Thus, when the line 22b is crossed, switch 84 will be switched to its second state causing the output line PL to initiate a program left turn sequence although the implement raising and lowering operations as well as the throttling operations will be the same as that described above.

The description of FIGURE 5 has been given in block diagram terms since there are innumerable different ways in which the programmed sequence of operations can be controlled. As described, all of the required operations may occur within a predetermined distance after the first crossing of one of the lines 22a or 22b, or within a fixed time interval of such crossing. Similarly, the operations may occur at or about the time the tractor crosses the line 22a or 22b, that is signals from the receiver 25 may directly control the implement and throttling operations of the tractor.

As explained in application No. 531,603, the invention is not limited to specific means for raising and lowering the implement or for changing the speed of the tractor, and the references incorporated therein apply equally to the present invention. To avoid redundancy, the present disclosure contains no specific reference to the remote radio control circuits, but again the systems illustrated in application No. 531,603 can be used for that purpose. In FIGURE 3B, the lines labelled RR and RL represent, respectively, remote right and remote left operations initiated by means of a radio signal. The presence of either of these signals may be used to override any of the programmed or automatic signals appearing in the circuit.

What is claimed is:

1. Sensing apparatus for use with a steerable vehicle adapted to follow a path defined by an elongated conductor, comprising in combination an elongated conductor having associated therewith an electrical field first, second and third coils mounted in a fixed relationship relative to each other, with the central axes of said first and second coils forming equal acute angles with said conductor and extending in opposite directions therefrom along the ground when said vehicle is following said path, and the central axis of said third coil being substantially transverse to said conductor when said vehicle is following said path, said first and second coils being electrically connected in series and wound such that respective voltages induced therein oppose each other, and means for comparing the phase of the voltage at the junction of said first and second coils with the voltage across said third coil, said comparing means comprising means for producing a first control signal when said phases differ and a second control signal when said phases are the same, said control signals being adapted to control the direction in which said vehicle is steered.

2. Sensing apparatus according to claim 1, wherein the central axes of said first and second coils are substantially horizontal.

3. Sensing apparatus according to claim 1 or 2, including means for orienting said coils in a direction corresponding to the direction in which said vehicle is being steered.

4. A sensing apparatus according to claim 1, wherein each of said equal acute angles is equal to approximately sixty degrees.

References Cited
UNITED STATES PATENTS

| | | | |
|---|---|---|---|
| 3,009,525 | 11/1961 | De Liban | 180—98 |
| 2,990,902 | 7/1961 | Cataldo | 180—79.1 |
| 2,996,137 | 8/1961 | Chu et al. | 180—79.1 |
| 3,169,598 | 2/1965 | Finn-Kelcey et al. | 180—79 |
| 3,294,178 | 12/1966 | Lawson et al. | 180—79.1 |

BENJAMIN HERSH, Primary Examiner

JOHN A. PEKAR, Assistant Examiner